United States Patent
Li

(10) Patent No.: US 11,077,718 B2
(45) Date of Patent: Aug. 3, 2021

(54) HEAVY-DUTY PNEUMATIC TIRE

(71) Applicant: Sumitomo Rubber Industries, Ltd., Kobe (JP)

(72) Inventor: Qingmao Li, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 263 days.

(21) Appl. No.: 15/883,476

(22) Filed: Jan. 30, 2018

(65) Prior Publication Data

US 2018/0236821 A1    Aug. 23, 2018

(30) Foreign Application Priority Data

Feb. 20, 2017   (JP) .............................. JP2017-029247

(51) Int. Cl.
*B60C 11/12*   (2006.01)
*B60C 11/04*   (2006.01)
*B60C 11/03*   (2006.01)

(52) U.S. Cl.
CPC ........ *B60C 11/1236* (2013.01); *B60C 11/047* (2013.01); *B60C 11/1204* (2013.01); *B60C 2011/0351* (2013.01); *B60C 2011/0353* (2013.01); *B60C 2011/0355* (2013.01); *B60C 2011/0362* (2013.01); *B60C 2011/0365* (2013.01); *B60C 2011/0367* (2013.01); *B60C 2011/0381* (2013.01); *B60C 2011/0386* (2013.01); *B60C 2011/0388* (2013.01); *B60C 2200/06* (2013.01)

(58) Field of Classification Search
CPC . B60C 2200/06; B60C 11/03; B60C 11/0306; B60C 11/0386; B60C 11/0388; B60C 11/047; B60C 11/1236; B60C 11/1245; B60C 11/1204; B60C 11/12
See application file for complete search history.

(56) References Cited

U.S. PATENT DOCUMENTS

2011/0315288 A1    12/2011  Yamahira et al.
2012/0247632 A1*   10/2012  Hayashi ................. B60C 11/12
                                                            152/209.22

FOREIGN PATENT DOCUMENTS

| EP | 2623340 B1 | * | 4/2018 |
|----|------------|---|--------|
| JP | H0680002 A | * | 3/1994 |
| JP | 2002046426 A | * | 2/2002 |
| JP | 2012-6484 A |   | 1/2012 |
| JP | 2012020620 A | * | 2/2012 |
| JP | 2013001342 A | * | 1/2013 |

* cited by examiner

*Primary Examiner* — Steven D Maki
*Assistant Examiner* — Cedrick S Williams
(74) *Attorney, Agent, or Firm* — Birch, Stewart, Kolasch & Birch, LLP

(57) ABSTRACT

A heavy-duty pneumatic tire comprises a crown rib and a middle rib. The crown rib is provided with crown sipes crossing the crown rib. The middle rib is provided with middle sipes crossing the middle rib and a middle shallow groove having a smaller depth and a larger width than the middle sipes. The middle shallow groove comprises a circumferential middle shallow groove extending in a tire circumferential direction and lateral middle shallow grooves extending from an axially inner side edge (Ema) of the middle rib to the circumferential middle shallow groove so as to terminate at a position thereof.

19 Claims, 4 Drawing Sheets

HEAVY-DUTY PNEUMATIC TIRE

TECHNICAL FIELD

The present invention relates to a heavy-duty pneumatic tire to be used for a heavy load vehicle such as a truck or a bus.

BACKGROUND ART

Japanese unexamined Patent Application Publication No. 2012-6484 (Patent Literature 1) has proposed a heavy-duty pneumatic tire. The heavy-duty pneumatic tire has a tread portion including a plurality of main grooves extending continuously in a tire circumferential direction and a plurality of ribs divided by the main grooves. The plurality of the ribs includes a crown rib, a pair of middle ribs, and a pair of shoulder ribs. Each of the crown rib and the middle ribs is provided only with sipes crossing the rib.

However, the heavy-duty pneumatic tire disclosed in Patent Literature 1 has room for improvement in running performance on a wet road surface, in particular, cornering running performance on a wet road surface. On the other hand, adding a groove or a sipe having an edge component in the tire circumferential direction in order to improve the cornering running performance on a wet road surface has a disadvantage of newly causing uneven wear.

SUMMARY OF THE INVENTION

The present invention was made in view of the above, and a primary object thereof is to provide a heavy-duty pneumatic tire having improved cornering running performance while maintaining uneven wear resistance performance.

In one aspect of the present invention, a tire comprises a tread portion comprising a plurality of main grooves extending straight and continuously in a tire circumferential direction, and a plurality of ribs divided by the main grooves, wherein the ribs include a crown rib arranged closest to a tire equator and at least one middle rib arranged adjacently to the crown rib, the crown rib is provided with crown sipes crossing the crown rib in a tire axial direction and arranged separately from each other in the tire circumferential direction, the at least one middle rib is provided with middle sipes crossing the at least one middle rib in the tire axial direction and arranged separately in the tire circumferential direction and a middle shallow groove having a smaller depth and a larger width than the middle sipes, and the middle shallow groove comprises a circumferential middle shallow groove extending in the tire circumferential direction so as to divide the at least one middle rib into an inner portion and an outer portion in the tire axial direction and lateral middle shallow grooves extending from an axially inner side edge of the at least one middle rib to the circumferential middle shallow groove so as to terminate at a position thereof.

In another aspect of the invention, it is preferred that the circumferential middle shallow groove is arranged so that the inner portion of the at least one middle rib has a width not less than 0.5 times a maximum width of the at least one middle rib.

In another aspect of the invention, it is preferred that the width of the inner portion of the at least one middle rib is not less than 0.5 times and not more than 0.8 times the maximum width of the at least one middle rib.

In another aspect of the invention, it is preferred that both side edges in the tire axial direction of the at least one middle rib are provided with recessed portions, and the recessed portions of the at least one middle rib are connected with only both ends of the middle sipes.

In another aspect of the invention, it is preferred that both side edges in the tire axial direction of the crown rib are provided with recessed portions, and the recessed portions of the crown rib are connected with only both ends of the crown sipes.

In another aspect of the invention, it is preferred that each of the crown sipes is inclined in a first direction with respect to the tire axial direction, the crown rib is provided with crown shallow grooves arranged separately from each other in the tire circumferential direction, and each of the crown shallow grooves comprises a pair of end portions inclined in the first direction and a middle portion arranged between the pair of the end portions and inclined in an opposite direction to the first direction.

In another aspect of the invention, it is preferred that at least one of the crown sipes intersects with the middle portion of one of the crown shallow grooves.

In this specification, "sipe" means a groove having a width not greater than 1.5 mm, and opposing sipe walls thereof come into contact with each other upon contacting the ground.

DESCRIPTION OF THE PREFERRED EMBODIMENT

An embodiment of the present invention will now be described in detail.

Figure 1:
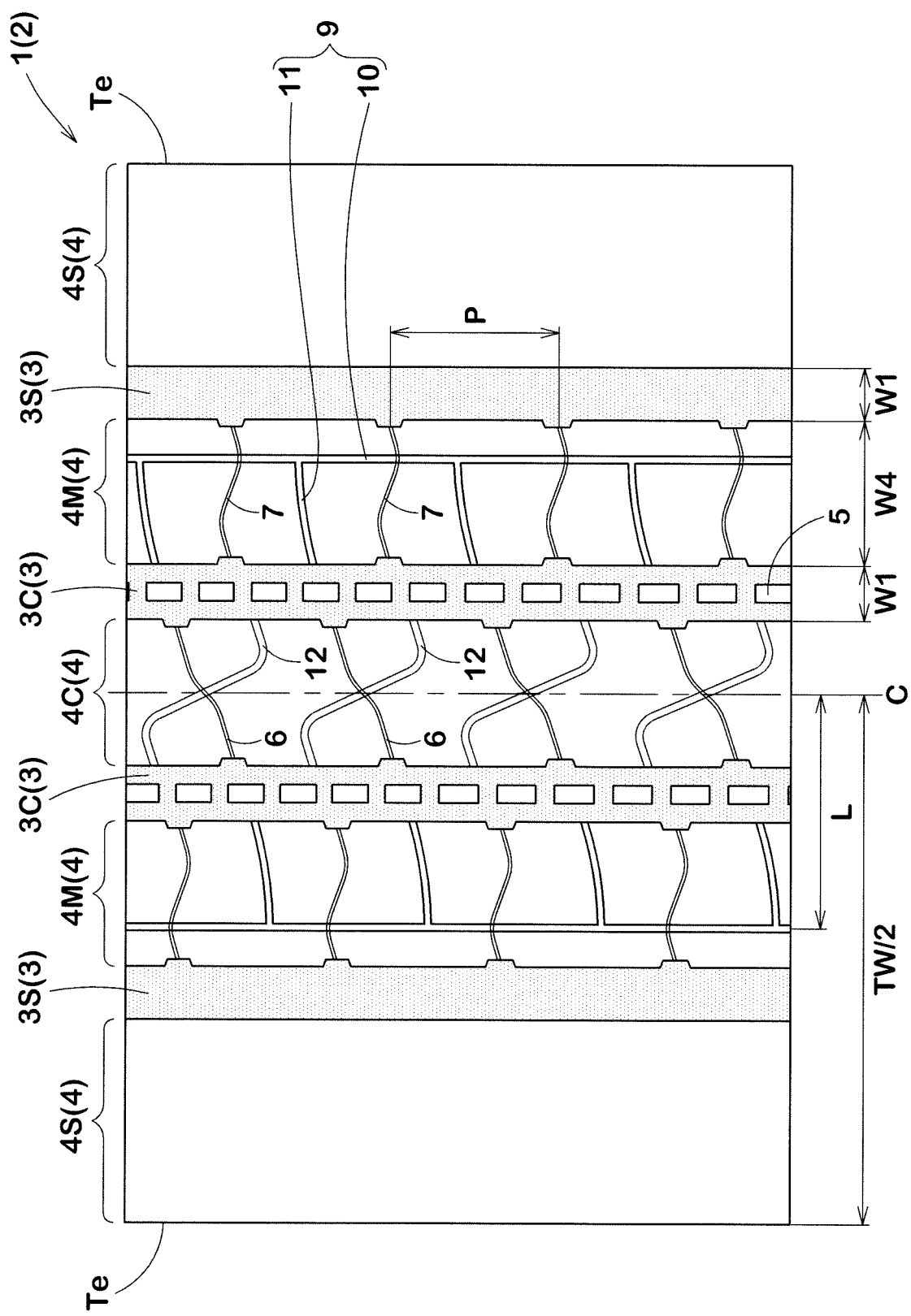
FIG. 1 is a development view of a tread portion of a heavy-duty pneumatic tire according to an embodiment of the present invention.

As shown in FIG. 1, a heavy-duty pneumatic tire (hereinafter may be simply referred to as "tire") 1 of the present invention includes a tread portion 2 provided with a plurality of main grooves 3 extending straight and continuously in the tire circumferential direction and a plurality of ribs 4 divided by the main grooves 3.

Further, the ribs 4 include a crown rib 4c arranged closest to a tire equator (C) and at least one middle rib 4M arranged adjacent to the crown rib 4C.

In this embodiment, the main grooves 3 includes a pair of crown main grooves 3C arranged on both sides of the tire equator (C) and a pair of shoulder main grooves 3S each arranged between one of the crown main grooves 3C and its adjacent one of tread edges (Te). Further, the ribs 4 include the crown rib 4C arranged between the crown main grooves 3C and extending on the tire equator (C), the middle ribs 4M each arranged between one of the crown main grooves 3C and its adjacent one of the shoulder main grooves 3S, and a pair of shoulder ribs 4S each arranged between one of the shoulder main grooves 3S and its adjacent one of the tread edges (Te).

The "tread edges" (Te) are defined as outermost ground contacting positions in a tire axial direction when the tire 1 in a standard state is in contact with a flat surface with zero camber angle by being loaded with a standard tire load.

the "standard state" is a state in which the tire 1 is mounted on a standard rim (not shown), inflated to a standard pressure, and loaded with no tire load. In this specification, unless otherwise noted, dimensions and the like of various parts of the tire 1 are values measured in the standard state. Further, a groove width of each of the grooves is a value thereof measured in a direction perpendicular to a longitudinal direction thereof and measured on a tread face unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Groove widths and groove depths of the crown main grooves 3C and the shoulder main grooves 3S can be determined according to the custom. If the groove widths and/or the groove depths become small, groove volumes are decreased, therefore, wet performance tends to decrease. To the contrary, if the groove widths and/or the groove depths become large, pattern rigidity is decreased, therefore, the uneven wear resistance performance and steering stability on a dry road surface (hereinafter may be referred to as "dry steering stability") tend to decrease. Thereby, it is preferred that groove widths W1 of the crown main grooves 3C and the shoulder main grooves 3S are in a range of from 10 to 18 mm. Further, it is preferred that groove depths D1 (shown in FIGS. 4A and 4B) are in a range of from 15 to 20 mm. The groove depths D1 and the groove widths W1 may be different for each of the main grooves.

The crown main grooves 3C in this embodiment are provided with protruding portions 5 protruding from groove bottoms thereof and arranged separately from each other with space between each other in the tire circumferential direction so as to prevent stone biting.

The protruding portions 5 can be omitted depending on needs. Note that the shoulder main grooves 3S may be provided with the protruding portions 5 protruding from groove bottoms thereof.

Each of the crown rib 4C and the middle ribs 4M are provided respectively with crown sipes 6 and middle sipes 7 crossing the rib in the tire axial direction and arranged separately from each other with space between each other in the tire circumferential direction.

Figure 2:
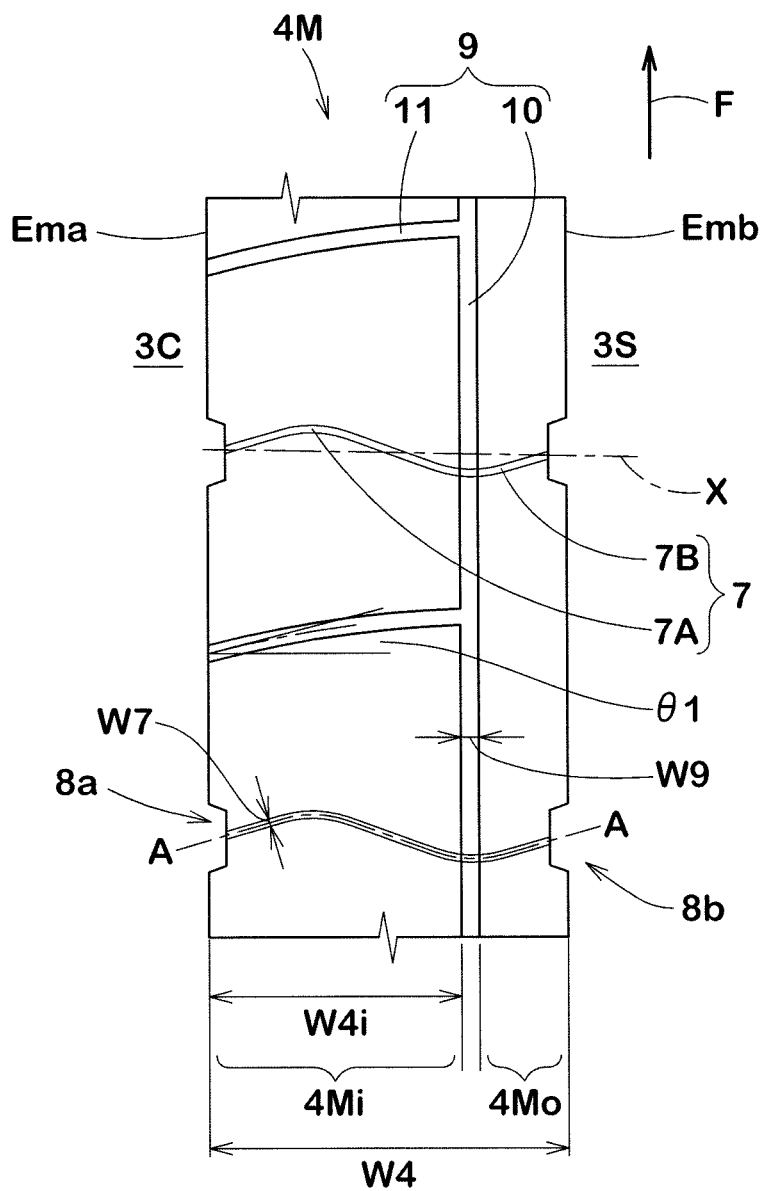
FIG. 2 is an enlarged partial view of a middle rib.

As shown in FIG. 2, an inner side edge (Ema) and an outer side edge (Emb) in the tire axial direction of each of the middle ribs 4M is respectively provided with recessed portions (8a) and (8b) recessed toward inside of the middle rib 4M. Both ends of the middle sipes 7 are connected with the recessed portions (8a) and (8b).

The recessed portions (8a) and the recessed portions (8b) in this embodiment are aligned in the tire axial direction so as to face each other, that is, to recess toward each other. Here, "face" means that in a pair of the recessed portion (8a) and the recessed portion (8b), at least a part of them overlap each other when viewed in the tire axial direction. In at least one, preferably each, of the middle sipes 7, a reference line (X) passing through both ends of the middle sipe 7 is inclined at an angle not more than 5 degrees with respect to the tire axial direction, for example. At least one, preferably each, of the middle sipes 7 in this embodiment is formed in an S-shape and includes an arc-shaped curved portion 7A arranged on one side in the tire axial direction of the reference line (X) and an arc-shaped curved portion 7B arranged on the other side in the tire axial direction of the reference line (X).

Figure 4A:
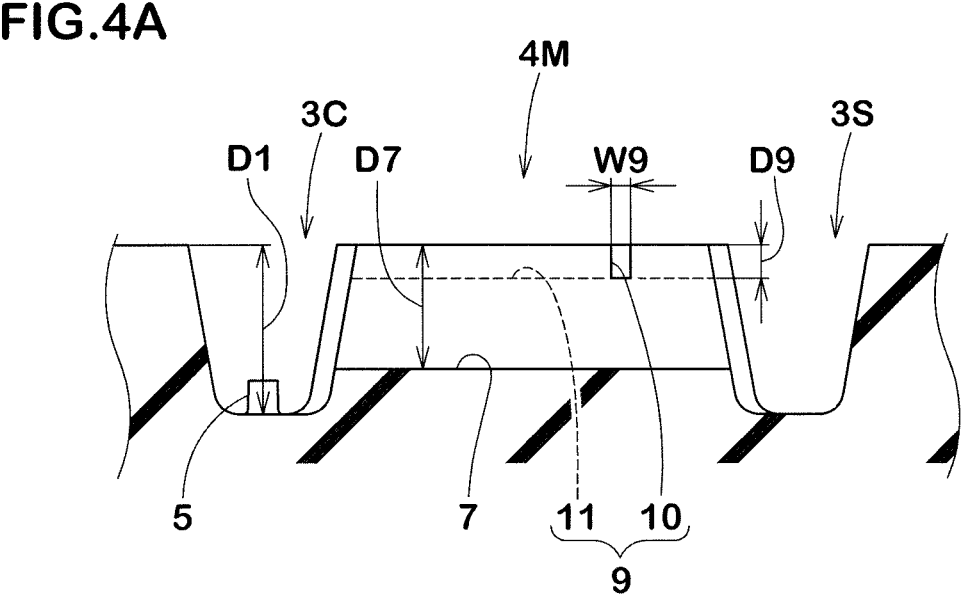
FIG. 4A is a cross-sectional view taken along A-A line of FIG. 2.

The middle rib 4M is further provided with a middle shallow groove 9. As shown in FIG. 4A, a depth D9 of the middle shallow groove 9 is smaller than depths D7 of the middle sipes 7, and a width W9 of the middle shallow groove 9 is larger than widths W7 of the middle sipes 7 (Shown in FIG. 2).

As shown in FIG. 2, the middle shallow groove 9 is composed of a circumferential middle shallow groove 10 and lateral middle shallow grooves 11.

The circumferential middle shallow groove 10 extends along the tire circumferential direction so as to divide the middle rib 4M into an inner portion (4Mi) and an outer portion (4Mo) in the tire axial direction. It is preferred that a width (W4i) of the inner portion (4Mi) in the tire axial direction is not less than 0.5 times a maximum width W4 of the middle rib 4M and not more than 0.8 times the maximum width W4. In this embodiment, each of the inner side edge (Ema) and the outer side edge (Emb) extends as a straight line, therefore, a distance between the inner side edge (Ema) and the outer side edge (Emb) in the tire axial direction is the maximum width W4. The circumferential middle shallow groove 10 in this embodiment extends straight in the tire circumferential direction, but it may be configured to extend in a zigzag shape (including wavy shape). In this case, it is preferred that each of a maximum width and a minimum width of the inner portion (4Mi) fall within a range of from 0.5 to 0.8 times the maximum width W4 of the middle rib 4M.

Each of the lateral middle shallow grooves 11 extends from the inner side edge (Ema) of the middle rib 4M to the circumferential middle shallow groove 10 and terminates at the position of the circumferential middle shallow groove 10. The lateral middle shallow grooves 11 in this embodiment are connected with the crown main grooves 3C at positions other than the recessed portions (8a). That is, only both ends of the middle sipes 7 are connected with the recessed portions (8a) and (8b). The recessed portions (8a) and (8b) configured as such have an effect of preventing rubber chipping at both ends of the middle sipes 7. Note that the lateral middle shallow grooves 11 and the middle sipes 7 are arranged alternately in the tire circumferential direction.

It is preferred that the lateral middle shallow grooves 11 in entirety thereof are inclined in a first direction (F) with respect to the tire axial direction. The lateral middle shallow grooves 11 in this embodiment are configured as arc-shaped curved grooves. In each of the curved grooves, an angle θ1 of a tangent with respect to the tire axial direction gradually decreases axially outwardly. The angles θ1 at inner ends of the lateral middle shallow grooves 11 with respect to the tire axial direction is preferably not more than 45 degrees, more preferably not more than 30 degrees. Note that the lateral middle shallow grooves 11 may be configured as straight grooves. In this case, the angles θ1 of the straight grooves with respect to the tire axial direction are preferably not more than 45 degrees, more preferably not more than 30 degrees.

Large ground contact pressure is applied to the crown rib 4C and the middle ribs 4M. Thereby, it is possible that the wet performance is improved by providing the crown sipes 6 and the middle sipes 7 having edge components in the tire axial direction in the crown rib 4C and the middle ribs 4M to which large ground contact pressure is applied. Further, the lateral middle shallow grooves 11 provide the middle ribs 4M with the edge components in the tire axial direction in addition to the middle sipes 7. Thereby, it is possible that the wet performance is further improved.

Furthermore, the circumferential middle shallow groove 10 provides the edge components in the tire circumferential direction to the middle ribs 4M to which large ground contact pressure is applied during cornering. Thereby, it is possible that cornering performance on a wet road surface is improved.

Normally, uneven wear, such as rail wear, tends to occur in axially outer parts of the middle ribs 4M. However, in the tire 1, the lateral middle shallow grooves 11 terminate at the circumferential middle shallow grooves 10 without reaching the shoulder main grooves 3S. Therefore, it is possible that decrease in rigidity of the outer portions (4Mo) of the middle ribs 4M is suppressed, thereby, it is possible that the uneven wear in the portions is suppressed.

Particularly in this embodiment, the middle sipes 7 are curved in an S-shape and the lateral middle shallow grooves 11 are curved in an arc shape and inclined at the angle θ1, therefore, it is possible that edge components in the tire circumferential direction are further increased, thereby, it is possible that the cornering performance on a wet road surface is further improved.

As shown in FIG. 4A, it is preferred that the depths D7 of the middle sipes 7 are smaller than the groove depths D1 of the crown main grooves 3C and the shoulder main grooves 3S. In particular, it is preferred that the depths D7 are in a range of from 50% to 80% of the groove depths D1. If the groove depths D1 of the crown main grooves 3C are different from the groove depths D1 of the shoulder main grooves 3S, the smaller groove depths D1 of the main grooves 3 are used for the above range.

If the depths D7 of the middle sipes 7 are larger than 80% of the groove depths D1 of the main grooves 3, uneven wear (heal and toe wear and the like) tends to occur at the initial stage of wear. Conversely, if the depths D7 of the middle sipes 7 are less than 50% of the groove depths D1, the middle sipes 7 wear out in the middle of their wear life, therefore, effect of the wet performance cannot be exerted until the end of their wear life.

Further, it is preferred that the depths D9 of the middle shallow grooves 9 are smaller than the depths D7 of the middle sipes 7, and it is particularly preferred that the depths D9 are not more than 50% of the depths D7. Further, it is preferred that the depths D9 are not more than 30% of the groove depths D1. If the depths D9 are larger than the depths D7 and larger than 30% of the groove depths D1, rigidity of the middle ribs 4M tends to be insufficient, therefore, the uneven wear resistance performance and the dry steering stability are deteriorated.

Furthermore, the widths W9 of the middle shallow grooves 9 are smaller than the widths W7 (shown in FIG. 2) of the middle sipes 7, and it is preferred that the widths W9 are not more than 3.0 mm. If the widths W9 are smaller than the widths W7, drain effect by the middle shallow grooves 9 cannot be obtained, therefore, the wet performance at the beginning of wear cannot be fully exerted. On the contrary, if the widths W9 are more than 3.0 mm, wear resistance tends to be decreased.

Furthermore, if the widths (W4$i$) of the middle portions (4Mi) of the middle ribs 4M are less than 0.5 times the maximum widths W4 of the middle ribs 4M, edge effects by the lateral middle shallow grooves 11 are decreased, therefore, effect of improving the wet performance is decreased. On the contrary, if the widths (W4$i$) are larger than 0.8 times the maximum width W4, rigidity of the outer portions (4Mo) is decreased, therefore, the uneven wear such as the rail wear, for example, is likely to occur in the outer portions (4Mo). Note that, from the point of view of the uneven wear such as the rail wear, it is preferred that a distance (L) (shown in FIG. 1) between the tire equator (C) and a groove center of each of the circumferential middle shallow grooves 10 is not more than 0.6 times a tread half width (TW/2) which is a distance between the tire equator (C) and one of the tread edges (Te).

Note that if the angles θ1 of the lateral middle shallow grooves 11 are larger than 45 degrees, rigidity balance of the middle ribs 4M is lost, therefore, the uneven wear resistance performance is deteriorated.

Figure 3:
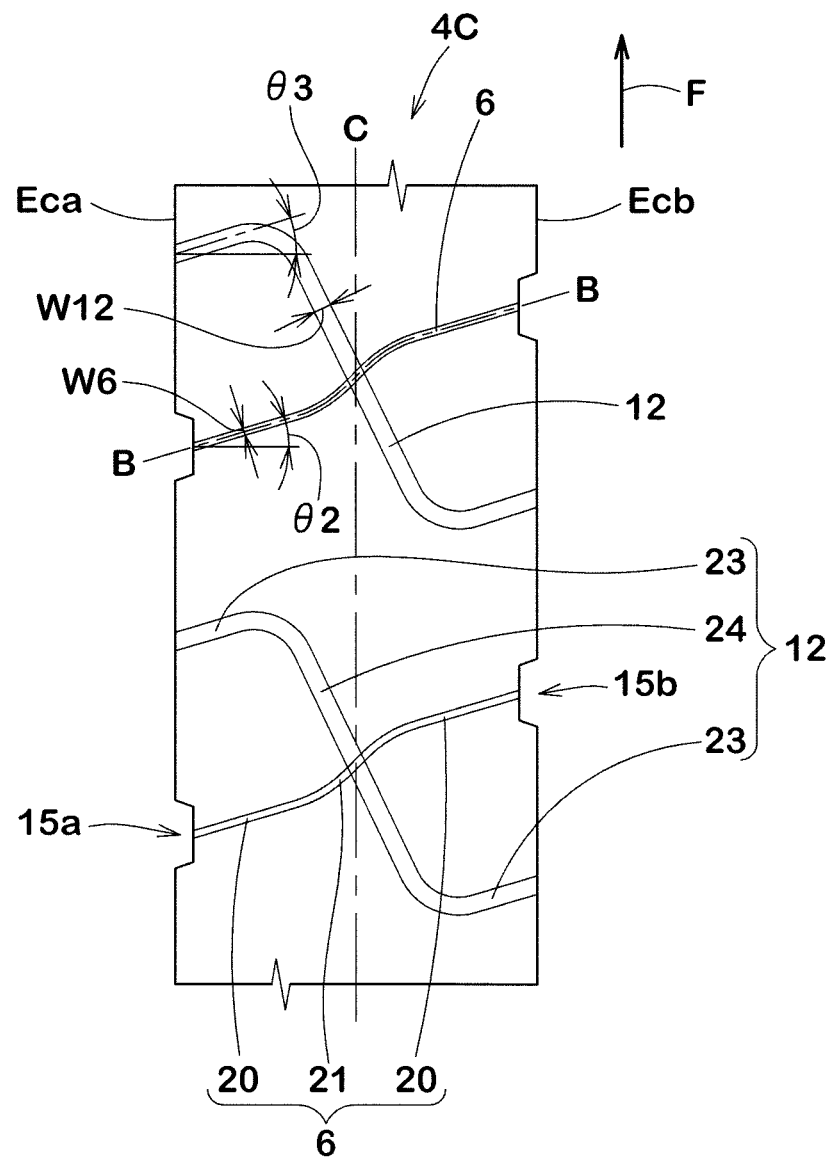
FIG. 3 is an enlarged partial view of a crown rib.
Figure 4B:
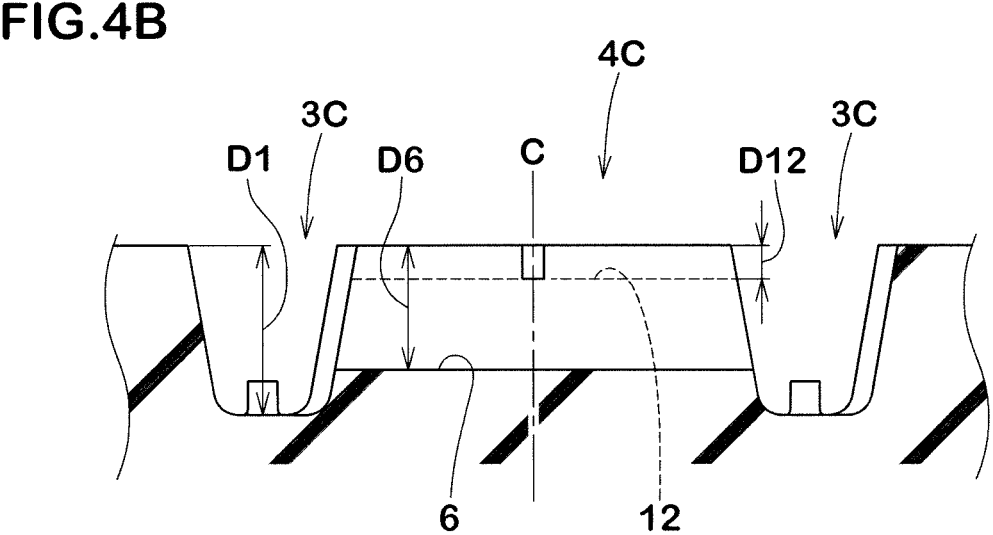
FIG. 4B is a cross-sectional view taken along B-B line of FIG. 3.

Next, as shown in FIG. 3, the crown rib 4C is provided, in addition to the crown sipes 6, with crown shallow grooves 12 arranged separately from each other with space between each other in the tire circumferential direction. As shown in FIG. 4B, depths D12 of the crown shallow grooves 12 are smaller than depths D6 of the crown sipes 6, and, as shown in FIG. 3, widths W12 of the crown shallow grooves 12 are larger than widths W6 of the crown sipes 6.

At least one, preferably each, of the crown sipes 6 in entirety thereof is inclined in the first direction (F). Each of the crown sipes 6 in this embodiment includes a pair of end portions 20 and a middle portion 21 having a larger inclination angle with respect to the tire axial direction than the pair of the end portions 20, for example. The end portions 20 and the middle portion 21 in this embodiment are smoothly connected with each other. It is preferred that angles θ2 of the end portions 20 with respect to the tire axial direction are in a range of from 10 to 30 degrees.

At least one, preferably each, of the crown shallow grooves 12 includes a pair of end portions 23 and an middle portion 24 arranged between the pair of the end portions 23 so as to form a hook shape. The end portions 23 and the middle portion 24 in this embodiment are smoothly connected with each other.

The end portions 23 are inclined in the first direction (F). The middle portion 24 is inclined in an opposite direction to the first direction (F). It is preferred that an angle θ3 of each of the end portions 23 with respect to the tire axial direction is set so that a difference |θ3-"2| between the angle θ3 and the angle θ2 is not more than 10 degrees, and it is more preferred that the difference |θ3-θ2| is not more than 5 degrees.

The crown sipes 6 and the crown shallow grooves 12 configured as such are inclined with respect to the tire axial direction, therefore, it is possible that edge components in the tire circumferential direction are increased, thereby, it is possible that the cornering performance on a wet road surface is further improved.

In this embodiment, the middle portion 21 of at least one, preferably each, of the crown sipes 6 and the middle portion 24 of one of the crown shallow grooves 12 adjacent to the crown Sipe intersect with each other substantially on the tire equator (C). The crown sipes 6 and the crown shallow grooves 12 configured as such intersect each other at large angles, therefore, even if large lateral force in the tire axial direction is applied to them, it is possible to effectively suppress the uneven wear due to uneven rigidity of the crown rib 4C.

The crown rib 4C is provided on both side edges (Eca) and (Ecb) thereof in the tire axial direction with recessed portions (15a) and (15b) recessed toward inside of the crown rib 4C, respectively. The recessed portions (15a) and the recessed portions (15b) are arranged alternately arranged in the tire circumferential direction.

Both ends of at least one, preferably each, of the crown sipes 6 are connected with one of the recessed portions (15a) and its adjacent one of the recessed portions (15b). In contrast, at least one, preferably each, of the crown shallow grooves 12 intersects with the crown main grooves 3C at positions other than the recessed portions (15a) and (15b). That is, only the both ends of the crown sipes 6 are connected with the recessed portions (15a) and (15b). The recessed portions (15a) and (15b) have an effect of preventing the rubber chipping at the both ends of the crown sipes 6.

It is preferred that the depths D6 and the widths W6 of the crown sipes 6 and the depths D12 and the widths W12 of the crown shallow grooves 12 are in a range shown below for the same reason as the depths D7 and the widths W7 of the middle sipes 7 and the depths D9 and the widths W9 of the middle shallow grooves 9. That is, as shown in FIG. 4B, it is preferred that the depths D6 of the crown sipes 6 are smaller than the groove depths D1, and it is particularly preferred that the depths D6 are in a range of from 50% to 80% of the groove depths D1. Further, the depths D12 of the crown shallow grooves 12 are smaller than the depths D6 of the crown sipes 6, and it is preferred that the depths D12 are not more than 50% of the depths D6 and not more than 30% of the groove depths D1. Furthermore, as shown in FIG. 3, the widths W12 of the crown shallow grooves 12 are larger than the widths W6 of the crown sipes 6, and it is preferred that the widths W12 are not more than 3.0 mm.

As shown in FIG. 1, it is preferred that each of pitches (P) in the tire circumferential direction of the middle sipes 7 is in a range of from 1.05 to 1.33 times the maximum width W4 of the middle rib 4M. The middle sipes 7 configured as such are preferable in order to maintain the rigidity of the middle ribs 4M in an appropriate range. Note that it is preferred that pitches in the tire circumferential direction of the crown sipes 6 are equal to the pitches (P) of the middle sipes 7 for the same reason.

Further, the shoulder ribs 4S are not provided with sipes and shallow grooves.

While detailed description has been made of an especially preferred embodiment of the present invention, the present invention can be embodied in various forms without being limited to the illustrated embodiment.

Working Example (Example)

Heavy-duty pneumatic tires of size 295/80R22.5 having the basic tread pattern shown in FIG. 1 were made by way of test according to the specifications listed in Table 1. Then each of the test tires was tested for the wet performance (the cornering performance and braking performance) and the uneven wear resistance performance. Note that, in a case where the shoulder ribs are provided with the shallow grooves, depths and widths of the shallow grooves are the same size as the lateral middle shallow grooves and the shallow grooves are formed so as to cross the shoulder ribs in the tire axial direction. Except for those listed in Table 1, each of the test tires has substantially the same configuration.

Common Specifications:
<Middle Sipes>
  Depth D7: 60% of groove depth D1 of main groove
<Circumferential middle shallow grooves and Lateral middle shallow grooves>
  Depth D9: 14% of groove depth D1 of main groove
  Width W9: 1.5 mm
<Crown Sipes>
  Depth D6: 60% of groove depth D1 of main groove
<Crown Shallow Grooves>
  Depth D12: 14% of groove depth D1 of main groove
  Width W12: 1.5 mm (1) Wet performance (Cornering performance and Braking performance):

Each of the test tires was mounted on a rim (9.00×22.5) of a steering wheel of a bus and inflated to the standard pressure, and then the bus was driven on a wet paved road of a test course. The cornering performance and the braking performance were evaluated by the driver's feeling during the test drive, and the results are indicated by an index based on Comparative Example 1 being 100, wherein a larger numerical value id better.

(2) Uneven wear resistance:

By using the above-mentioned bus, wear amounts at a plurality of positions of each of the test tires after running on a predetermined route for a predetermined distance were measured. The uneven wear resistance performance was evaluated based on the variation in the wear amount described above. The results are indicated by an index based on the Comparative Example 1 being 100, wherein a larger numerical value is better.

TABLE 1

|  | Ref. 1 | Ex. 1 | Ex. 2 | Ex. 3 | Ex. 4 | Ex. 5 | Ex. 6 |
| --- | --- | --- | --- | --- | --- | --- | --- |
| <Middle rib> | | | | | | | |
| Middle sipe | Absence | | | | Presence | | |
| Circumferential middle shallow groove | Absence | | | | Presence | | |
| Lateral middle shallow groove | | | | Presence | | | |
| Width (W4i)/Maximum width W4 | — | 0.7 | 0.7 | 0.85 | 0.85 | 0.5 | 0.8 |
| <Crown rib> | | | | | | | |
| Crown sipe | Absence | | | | Presence | | |
| Crown shallow | | | | | Presence | | |

TABLE 1-continued

|  | Ref. 1 | Ex. 1 | Ex. 2 | Ex. 3 | Ex. 4 | Ex. 5 | Ex. 6 |
|---|---|---|---|---|---|---|---|
| groove |  |  |  |  |  |  |  |
| < Shoulder rib > |  |  |  |  |  |  |  |
| Shallow groove | Presence | Absence | Presence | Absence | Presence | Absence | Absence |
| Wet performance |  |  |  |  |  |  |  |
| Cornering performance | 100 | 110 | 110 | 110 | 110 | 110 | 110 |
| Braking performance | 100 | 103 | 105 | 104 | 106 | 100 | 103 |
| Uneven wear resistance performance | 100 | 114 | 100 | 106 | 97 | 114 | 110 |

As is apparent from Table 1, it was confirmed that in the tires as the Examples the cornering running performance on a wet road surface is improved while the uneven wear resistance performance being maintained as compared with the tires as the Comparative Example 1.

The invention claimed is:

1. A heavy-duty pneumatic tire comprising:
a tread portion comprising a plurality of main grooves extending straight and continuously in a tire circumferential direction, and a plurality of ribs divided by the main grooves, wherein
the ribs include a crown rib arranged closest to a tire equator and at least one middle rib arranged adjacently to the crown rib,
the crown rib is provided with crown sipes crossing the crown rib in a tire axial direction and arranged separately from each other in the tire circumferential direction,
the at least one middle rib is provided with middle sipes crossing the at least one middle rib in the tire axial direction and arranged separately in the tire circumferential direction and middle shallow grooves having a smaller depth and a larger width than the middle sipes,
the middle shallow grooves comprise a circumferential middle shallow groove extending in the tire circumferential direction so as to divide the at least one middle rib into an inner portion and an outer portion in the tire axial direction and lateral middle shallow grooves extending from an axially inner side edge of the at least one middle rib to the circumferential middle shallow groove so as to terminate at a position thereof,
at least one of the middle sipes is formed in an S-shape and includes an arc-shaped curved portion intersecting an axially extending reference line on one side in the tire axial direction and an arc-shaped curved portion intersecting the axially extending reference line on the other side in the tire axial direction,
the axially extending reference line passes through both ends of the middle sipe,
each of the crown sipes is inclined to one side with respect to the tire axial direction,
the crown rib is provided with crown shallow grooves arranged separately from each other in the tire circumferential direction, and
each of the crown shallow grooves comprises a pair of end portions and a middle portion arranged between the pair of the end portions so as to connect them, wherein the end portions are inclined to the one side and the middle portion is inclined to the other side with respect to the tire axial direction.

2. The heavy-duty pneumatic tire according to claim 1, wherein at least one of the crown sipes intersects with the middle portion of one of the crown shallow grooves.

3. The heavy-duty pneumatic tire according to claim 1, wherein the lateral middle shallow grooves and the middle sipes are arranged alternately in the tire circumferential direction.

4. The heavy-duty pneumatic tire according to claim 1, wherein
the lateral middle shallow grooves are arc-shaped curved grooves, and
angles at inner ends of the lateral middle shallow grooves with respect to the tire axial direction are each not more than 45 degrees.

5. The heavy-duty pneumatic tire according to claim 1, wherein a depth of the middle shallow grooves is not more than 50% of each of the depths of the middle sipes.

6. The heavy-duty pneumatic tire according to claim 1, wherein the depth of the middle shallow grooves is not more than 30% of each of groove depths of the main grooves.

7. The heavy-duty pneumatic tire according to claim 1, wherein a distance between the tire equator and a groove center of the circumferential middle shallow groove is not more than 0.6 times a tread half width which is a distance between the tire equator and one of tread edges.

8. The heavy-duty pneumatic tire according to claim 1, wherein each of depths of the crown shallow grooves are not more than 50% of each of depths of the crown sipes.

9. The heavy-duty pneumatic tire according to claim 1, wherein each of depths of the crown shallow grooves are not more than 30% of each of groove depths of the main grooves.

10. The heavy-duty pneumatic tire according to claim 1, wherein the reference line is inclined at an angle not more than 5 degrees with respect to the tire axial direction.

11. The heavy-duty pneumatic tire according to claim 1, wherein the circumferential middle shallow groove is arranged so that the inner portion of the at least one middle rib has a width not less than 0.5 times a maximum width of the at least one middle rib.

12. The heavy-duty pneumatic tire according to claim 11, wherein the width of the inner portion of the at least one middle rib is not less than 0.5 times and not more than 0.8 times the maximum width of the at least one middle rib.

13. The heavy-duty pneumatic tire according to claim 11, wherein each of a maximum width and a minimum width of the inner portion is in a range of from 0.5 to 0.8 times the maximum width of the at least one middle rib.

14. The heavy-duty pneumatic tire according to claim 11, wherein each of pitches in the tire circumferential direction of the middle sipes is in a range of from 1.05 to 1.33 times the maximum width of the at least one middle rib.

15. The heavy-duty pneumatic tire according to claim 1, wherein
both side edges in the tire axial direction of the at least one middle rib are provided with recessed portions, and
the recessed portions of the at least one middle rib are connected with only both ends of the middle sipes.

16. The heavy-duty pneumatic tire according to claim 15, wherein each of the recessed portions of the at least one middle rib has a length in the tire axial direction smaller than a width in the tire circumferential direction.

17. The heavy-duty pneumatic tire according to claim 15, wherein in each of the middle sipes, the recessed portions connected with both ends of the middle sipe are aligned in the tire axial direction so as to face each other such that at least a part of the recessed portions overlap each other when viewed along a straight line in the tire axial direction.

18. The heavy-duty pneumatic tire according to claim 1, wherein
both side edges in the tire axial direction of the crown rib are provided with recessed portions, and
the recessed portions of the crown rib are connected with only both ends of the crown sipes.

19. The heavy-duty pneumatic tire according to claim 18, wherein each of the recessed portions of the crown rib has a length in the tire axial direction smaller than a width in the tire circumferential direction.

* * * * *